(12) United States Patent
Böhm et al.

(10) Patent No.: US 11,703,256 B2
(45) Date of Patent: Jul. 18, 2023

(54) APPARATUS AND METHOD FOR ESTABLISHING A TEMPERATURE GRADIENT

(71) Applicants: Gerald Böhm, Waidhofen an der Thaya (AT); Rudolf Hirschmanner, Feldbach (AT); Siegfried Maierhofer, St. Marein im Mürztal (AT)

(72) Inventors: Gerald Böhm, Waidhofen an der Thaya (AT); Rudolf Hirschmanner, Feldbach (AT); Siegfried Maierhofer, St. Marein im Mürztal (AT)

( * ) Notice: Subject to any disclaimer, the term of this patent is extended or adjusted under 35 U.S.C. 154(b) by 43 days.

(21) Appl. No.: 16/965,875

(22) PCT Filed: Jan. 29, 2019

(86) PCT No.: PCT/AT2019/060036
§ 371 (c)(1),
(2) Date: Jul. 29, 2020

(87) PCT Pub. No.: WO2019/148226
PCT Pub. Date: Aug. 8, 2019

(65) Prior Publication Data
US 2021/0025625 A1    Jan. 28, 2021

(30) Foreign Application Priority Data

Jan. 30, 2018  (AT) .................................. 50086/2018

(51) Int. Cl.
*F25B 21/00* (2006.01)
(52) U.S. Cl.
CPC .......... *F25B 21/00* (2013.01); *F25B 2321/00* (2013.01)
(58) Field of Classification Search
CPC ....... F25B 21/00; F25B 2321/00; Y02B 30/00
(Continued)

(56) References Cited

U.S. PATENT DOCUMENTS

| 2,800,772 A * | 7/1957 | Carroll ................... F25B 21/00 136/204 |
| 2003/0184188 A1* | 10/2003 | Kucherov ............... H01J 45/00 310/306 |

(Continued)

FOREIGN PATENT DOCUMENTS

| AT | 512 577 | 9/2013 |
| AT | 514 110 | 10/2014 |

(Continued)

OTHER PUBLICATIONS

Int'l Search Report (Form PCT/ISA/210) conducted in Int'l Appln. No. PCT/AT2019/060036 (dated Apr. 24, 2019).

(Continued)

*Primary Examiner* — Steve S Tanenbaum
(74) *Attorney, Agent, or Firm* — Greenblum & Bernstein, P.L.C.

(57) ABSTRACT

Apparatus and method for establishing a temperature gradient, comprising at least one gas-tight working space having a first boundary layer that is connected to a first electrode and a second boundary layer that is connected to a second electrode, wherein when an electric voltage is applied between the first electrode and the second electrode in the working space, an electric field can be produced between the first boundary surface and the second boundary surface, and wherein a distance between the first boundary surface and the second boundary surface is less than 5000 nm, wherein the first boundary surface comprises at least one field-enhancement device, in particular a peak, so that if an electric voltage is applied to the electrodes, a field strength of the electric field in a region of the field-enhancement device is greater than an average field strength of the electric field in the working space.

22 Claims, 2 Drawing Sheets

(58) Field of Classification Search
USPC .......................................................... 62/3.1
See application file for complete search history.

(56) References Cited

U.S. PATENT DOCUMENTS

| | | | | |
|---|---|---|---|---|
| 2004/0189141 | A1* | 9/2004 | Tavkhelidze | H01J 45/00 |
| | | | | 310/306 |
| 2006/0138896 | A1 | 6/2006 | Makansi | |
| 2012/0113420 | A1 | 5/2012 | Kuo et al. | |
| 2015/0068218 | A1* | 3/2015 | Hirschmanner | F25B 21/00 |
| | | | | 62/3.1 |
| 2016/0130489 | A1 | 5/2016 | Gilmour | |

FOREIGN PATENT DOCUMENTS

| | | |
|---|---|---|
| CN | 1491527 | 4/2004 |
| CN | 101438370 | 5/2009 |
| EP | 2 889 925 A1 | 7/2015 |
| JP | 2003-519769 A | 6/2003 |
| JP | 2004-15071 A | 5/2004 |
| JP | 2007-216193 A | 8/2007 |
| JP | 2009-525620 A | 7/2009 |
| RU | 2233509 C2 | 7/2004 |
| WO | 2007/100941 | 9/2007 |
| WO | 2014/030264 A1 | 2/2014 |

OTHER PUBLICATIONS

Int'l Written Opinion (Form PCT/ISA/237) conducted in Int'l Appln. No. PCT/AT2019/060036 (dated Apr. 24, 2019).
China Office Action conducted in counterpart China Appln. No. 201980022401.8 (dated Sep. 10, 2021) (w/ translation).
Russia Office Action conducted in counterpart Russia Appln. No. 2020128652/12(051130), dated May 26, 2022, along with English language translation. Note: The reference documents cited in the Russia Office Action, with the exception ofthe Russian patent document cited above (RU 2233509-C2) have previously been cited in the instant Office action by Applicant or the Examiner.
Office Action from the counterpart Japan Appln. No. 2020-562794, drafting date of Oct. 11, 2022, the Japanese Office action being an English language machine translation.

* cited by examiner

APPARATUS AND METHOD FOR ESTABLISHING A TEMPERATURE GRADIENT

BACKGROUND

1. Field of the Invention

The invention relates to an apparatus for establishing a temperature gradient, comprising at least one gas-tight working space having a first boundary surface that is connected to a first electrode and a second boundary surface that is connected to a second electrode, wherein when an electric voltage is applied between the first electrode and the second electrode in the working space, an electric field can be produced between the first boundary surface and the second boundary surface, and wherein a distance between the first boundary surface and the second boundary surface is less than 5000 nm.

2. Description of the Background

In addition, the invention relates to a method for establishing a temperature gradient with an apparatus that comprises a gas-tight working space having a first boundary surface and a second boundary surface by means of a working gas located in the working space, to which working gas an electric field is applied.

The invention furthermore relates to a method for transmitting electrical energy.

An apparatus and a method of the type named at the outset for establishing a temperature gradient have become known from the prior art. The document AT 512 577 A1 in particular discloses a method for establishing a temperature gradient as well as an apparatus for this purpose, wherein molecules or atoms of a working gas oscillate between an anode and a cathode in a working space, wherein in a movement against the electric field the molecules cool before they reach the anode. Thermal energy is thus transferred to the molecules at the anode, whereupon the molecules are moved in the direction of the cathode, wherein they absorb energy on the path to the cathode via the electric field, such that the molecules can release energy to the cathode upon a contact with the cathode.

With this method, it has proven disadvantageous that only a very small amount of energy can be transmitted between the anode and cathode.

SUMMARY

This is addressed by the invention. The object of the invention is to specify an apparatus of the type named at the outset with which larger amounts of energy can be transmitted or a larger temperature gradient can be produced.

Furthermore, a method of the type named at the outset is to be specified with which larger amounts of energy can be transmitted or a larger temperature gradient can be produced.

Additionally, a method for the particularly efficient transmission of electrical energy is to be specified.

The first object is attained using an apparatus of the type named at the outset in which the first boundary surface comprises at least one field-enhancement device, in particular a peak, so that when an electric voltage is applied to the electrodes, a field strength of the electric field in a region of the field-enhancement device is greater than an average field strength of the electric field in the working space.

In the context of the invention, it was recognized that an improved energy transmission, and therefore the establishment of a larger temperature gradient can be achieved if not only a natural molecular motion of the molecules is utilized, but rather molecules of the gas located in the working space are ionized so that the ionized molecules in the electric field are accelerated by the electric field. The ionization of the working gas thereby occurs at the field-enhancement device typically embodied as a peak, at which a field strength is greater than an average field strength of the electric field in the working space, which is normally embodied as a cavity arranged between plates which comprise the boundary surfaces.

To establish the temperature gradient, the molecules ionized at the field-enhancement device are thus accelerated towards the second boundary surface by the force acting on the ionized molecules in the electric field, at which second boundary surface the molecules release energy, whereupon the molecules are reflected by the second boundary surface. The molecules then move in the direction of the first boundary surface, wherein the molecules lose energy during the movement against the electric field and cool in the process so that they can absorb energy at the first boundary surface, wherein the first boundary surface cools. The molecules are subsequently accelerated by the electric field towards the second boundary surface, at which they release energy to the second boundary surface, wherein the second boundary surface is heated. In one of these movements, the molecule statistically re-enters the region of the field-enhancement device, so that the ionization of the molecules is maintained.

If, for example, the first electrode is positively charged relative to the second electrode, an electron is removed from a molecule located in the region of the field-enhancement device at the field-enhancement device as a result of the high field strength in the region of the field-enhancement device, so that a positively charged ion, referred to as a cation, forms from the previously uncharged molecule. This ionized molecule is accelerated towards the negatively-charged second boundary surface by the electric field, at which second boundary surface the molecule can release energy, whereupon it is reflected towards the first boundary surface, at which the molecule absorbs energy. In this manner, energy can be transmitted from the first boundary surface to the second boundary surface, wherein the second boundary surface has a higher temperature or is warmer than the first boundary surface, so that a temperature gradient develops between the second boundary surface and the first boundary surface.

It is beneficial if an electric field strength at the field-enhancement device is greater than at an average electric field strength in the working space by at least a factor of 10, preferably by a factor of 100, in particular by a factor of 1000. As a result, molecules of the working gas are only ionized at the field-enhancement device(s) of the first boundary surfaces, whereas an essentially homogeneous electric field is prevalent in the remaining portion of the working space.

The field-enhancement device can in principle have any desired form with which a field strength in a region of the field-enhancement device can be attained that is greater than an average field strength of the electric field in the working space. Typically, the field-enhancement device is embodied to be roughly cone-shaped, at least at the end side, and has a taper angle of preferably less than 30°. A particularly beneficial field exaggeration is thus achieved. Normally, the field-enhancement device is embodied to be roughly cone-shaped over the entire length thereof starting from a flat section of the first boundary surface, in order to achieve a beneficial ionization.

It has proven effective that a distance of the field-enhancement device from the second boundary surface is less than 90%, preferably less than 80%, of a maximum boundary surface spacing between a first boundary surface and a second boundary surface. A beneficial ionization of the working gas is thus achieved. The field-enhancement device thus normally protrudes into the working space from the first boundary surface by at least 10%, preferably at least 20% of the boundary surface spacing. It is beneficial if the field-enhancement device protrudes into the working space from the first boundary surface by less than 90% of the boundary surface spacing. The boundary surface spacing is typically less than 5000 nm so that a movement of the molecules or atoms between the first boundary surface and the second boundary surface can also occur as a result of a natural molecular motion.

Usually, multiple field-enhancement devices are provided at the first boundary surface, normally distributed uniformly on the first boundary surface. A distance between the field-enhancement devices is then typically 10% to 500% of the boundary surface spacing between the first boundary surface and the second boundary surface.

It is preferably provided that the working space is embodied such that, when an electric voltage is applied between the electrodes, an electric field is obtained in the working space, which electric field is essentially homogeneous over more than 50% of the working space, preferably over more than 70% of the working space, in particular over more than 90% of the working space. A beneficial molecular movement in the working space is thus obtained.

A transmission of large amounts of energy in a small space is possible in a particularly simple manner if the working space is embodied such that when an electric voltage is applied, an electric field is formed in the working space, which electric field is essentially homogeneous outside of a region that is spaced less than 1000 nm, in particular less than 500 nm, preferably less than 200 nm, from the at least one field-enhancement device.

For the ionization of the working gas with an electric field that is simultaneously as homogeneous as possible in the working space, it is beneficial if the field-enhancement device is embodied as a peak and, at one end, has an area of less than 10 nm$^2$, in particular less than 5 nm$^2$.

This area of the field-enhancement device is typically arranged roughly parallel to the first boundary surface. As a result, an advantageous ionization can be achieved even with a low number of field-enhancement devices. Fewer peaks in the working space are advantageous in order to achieve a beneficial energy transmission between the first boundary surface and the second boundary surface. The more peaks that are used, the better the molecules of the working gas can be ionized. With a correspondingly embodied field-enhancement device, a suitable energy transmission and gas ionization are thus achieved at the same time.

A compact installation space of the apparatus with simultaneously high effectiveness is achieved if the first boundary surface and the second boundary surface are embodied to be essentially flat.

Typically, the first boundary surface, with the exception of the field-enhancement devices protruding from this boundary surface, is embodied to be completely flat and the second boundary surface is embodied to be entirely flat.

In order to be able to transmit energy between the boundary surfaces in an effective manner, it is beneficial if a gas is arranged in the working space, which gas has a free path length of less than 5000 nm, in particular less than 1000 nm, preferably roughly 500 nm. Thus, during a movement between the boundary surfaces, molecules in the working space only rarely collide with other molecules, so that an energy exchange between molecules in the working space is only possible to a very limited extent, whereby energy transfer occurs between the boundary surfaces and does not occur, or only does so to a very limited extent, between atoms or molecules of the working gas.

Typically, a gas with low ionization energy, in particular argon, xenon, $C_{60}$, $C_{60}F_{60}$, iodine, $SF_6$ or $UF_6$, is arranged in the working space. Gases of this type have proven effective since they are easy to ionize and have a mass that is beneficial for a transmission of energy.

Normally, the apparatus is embodied such that a field strength is reached at the peak which, precisely for ionizing the working gas used, is sufficient to achieve a most homogeneous possible electric field in the working space and at the same time an ionization of the gas.

It is beneficial if an electron gas is arranged in the working space. This can be achieved, for example, if the first electrode is negatively charged relative to the second electrode, so that electrons are emitted at the field-enhancement device. These electrons, which constitute the electron gas, can then be used to transmit electrical energy with particularly low resistance, so that the apparatus can be used as a superconductor. As a result of the field-enhancement devices, the electron gas is maintained even when individual electrons exit the working space through the second boundary surface. Of course, a current flow then occurs in a direction, or on a plane, that is roughly 90° or perpendicular to a normal spacing between the first boundary surface and the second boundary surface.

It has proven effective that an easily ionizable gas, in particular lithium, sodium, potassium, rubidium, and/or cesium, is arranged in the working space, preferably in a plasma state. Such a plasma can also be used to transmit electrical energy or to conduct an electric current with particularly low electrical resistance so that the apparatus can be used as a superconductor with a corresponding plasma that can be maintained with an apparatus according to the invention even at a temperature of less than 100° C., in particular at room temperature. In this case, a current flow also occurs in a current flow direction transverse to a normal spacing between the boundary surfaces. For the supply of a corresponding plasma in the working space, it is beneficial if the first electrode is positively charged relative to the second electrode, so that at a field-enhancement device that is typically embodied as a peak, a molecule, for example a cesium molecule, can release an electron to the field-enhancement device so that a cesium molecule becomes positively charged and is available to conduct electrical energy. As a result of the field-enhancement devices, there thus occurs a positive charging of the molecules arranged in the working space, in particular of cesium molecules, so that they are then available for conducting electric current. Furthermore, a positive charging of the molecules in the working space, or the plasma, is maintained by the field-enhancement devices even if electrons enter the working space through the second boundary surface and neutralize individual molecules. The conductivity of the plasma is thus sustained.

To maintain a plasma or electron gas suitable for transmitting electrical energy in the working space in a direction transverse to a normal spacing between the boundary surfaces, it is particularly beneficial if the field-enhancement devices comprise peaks having a peak radius of less than 50 nm, preferably less than 20 nm, in particular roughly 12 nm, and the peaks of the field-enhancement devices are spaced less than 1000 nm, in particular roughly 450 nm, from the first boundary surface. A voltage of 10 volts applied to the working space can then be sufficient to supply a corresponding plasma, and a voltage of 1 volt applied to the working space can be sufficient to supply a corresponding electron gas. A partial pressure of the neutral particles in the working space can for this purpose be $10^{-8}$ bar to $10^{-5}$ bar, for example. Neutral particles in this case refer to those molecules which have not yet been ionized. A total pressure in the working space can be $10^{-5}$ bar for example.

With a plasma arranged in the working space or an electron gas formed accordingly, an electrical conductor can be created in a direction transverse to the normal spacing between the boundary surfaces, in which conductor an electric conductance is higher than in a metal by a factor of roughly ten thousand. Transmission losses can thus be reduced by a factor of $10^5$. Because the maintenance of the plasma or electron gas is necessary to maintain this conductivity, the conductivity can be easily activated and deactivated by applying the electric voltage between the electrodes. Thus, due to the electrons entering and exiting at the field-enhancing devices, a leakage current is respectively offset by the second boundary surface, which leakage current would otherwise lead to the neutralization of the working space or the neutralization of the molecules of the working space, so that no further conductivity would be present. The apparatus according to the invention can thus be used as an electrically switchable superconductor at room temperature, with which superconductor electrical energy can be transmitted, if necessary also over great distances, with particularly low losses.

In order to be able to conduct the method with a particularly low energy expenditure, it is advantageous if the second boundary surface is formed by a dielectric, in particular glass. As a result, a diffusion of electrons between the second electrode and the working space is reduced or prevented.

Advantageously, the second boundary surface is connected to the second electrode solely via a dielectric. In this manner, a current flow between the electrodes, which are typically planar and made of metal, is essentially avoided, which current flow could place the ionized molecules in an uncharged state again. Thus, an ionization of molecules at the peaks is only necessary when electrons diffuse into the working space from the second electrode through the dielectric, or, if the polarity is reversed, electrons diffuse from the working space to the second electrode through the dielectric, and the molecules are once again placed in an uncharged state.

To achieve an advantageous enhancement of the electric field at the peak relative to the average field strength of the electric field in the working space, it is advantageous if the at least one field-enhancement device is connected to the first electrode in an electrically conductive manner. As a result, molecules in the region of the peak can easily absorb electrons or, depending on the polarity of the first boundary surface, release electrons in the second boundary surface, in order to achieve a simple ionization of the working gas. For this purpose, the first boundary surface can be uniformly formed from a metal, and can be connected to the first electrode via a metal.

The first electrode and the second electrode are normally embodied to be planar and roughly parallel to the first boundary surface and to the second boundary surface.

According to the invention, the other object is attained with a method of the type named at the outset in which molecules of the working gas are ionized in the working space at a field-enhancement device arranged at the first boundary surface, whereupon the ionized molecules are moved to the second boundary surface by the electric field while being heated, at which second boundary surface the molecules release energy, after which the molecules are moved to the first boundary surface while being cooled, whereupon the molecules absorb energy at the first boundary surface. Through the use of ionized molecules or atoms in an electric field, relatively large amounts of energy can be transferred between the first boundary surface and the second boundary surface, even though the first boundary surface has a lower temperature than the second boundary surface. Thus, with the method according to the invention, thermal energy can be transferred from a colder to a warmer body.

Of course, the terms molecules and atoms are used synonymously in this case. The polarity of the applied electric field is not relevant to the effect of the method according to the invention. Regardless of whether the first boundary surface acts as an anode or as a cathode and whether the second boundary surface acts as a cathode or anode, a temperature gradient between the first boundary surface and the second boundary surface is produced when an electric voltage is applied between the electrodes, wherein the second boundary surface is normally warmer than the first boundary surface.

Typically, the method is essentially carried out without an input of energy. As a result, the production of a temperature gradient is artificially possible entirely without an input of energy, so that the method according to the invention can be used, for example, to operate a refrigerator or to obtain electrical energy from a temperature gradient as described in the document AT 514110 A1.

According to the invention, the other object is attained with a method for transmitting electrical energy in which an electric voltage is applied to a working space of an apparatus that comprises a gas-tight working space having a first boundary surface, at which field-enhancement devices are arranged, and a second boundary surface, in particular to a working space of an apparatus according to the invention, whereupon a plasma or an electron gas is formed in the working space by means of an electric field, after which electrical energy is transported along one direction by the plasma or by the electron gas.

It has been shown that, with an apparatus according to the invention, a corresponding plasma or electron gas can be formed in the working space in a particularly simple manner depending on the polarization of the voltage applied to the working space, with which plasma or electron gas electrical energy can be transported in a particularly low-loss manner.

Normally a plasma containing lithium, sodium, potassium, rubidium, and/or cesium is used at a pressure of $10^{-8}$ bar to $10^{-5}$ bar and at 20° C. to 100° C. with a voltage of 0.1 volts to 100 volts, in particular roughly 10 volts, applied to a working space between the boundary surfaces, so that a superconductor is obtained at room temperature. Of course, the current flow takes place with particularly low resistance through the plasma or the electron gas transverse to a normal spacing between the boundary surfaces, typically on a plane that is aligned roughly perpendicularly to a normal spacing between the boundary surfaces. The plasma or electron gas thus forms a conductive layer in the working space with particularly high conductivity.

It has proven effective that the apparatus according to the invention is used as an electrical conductor, in particular as a superconductor. Typically, a current flow thereby occurs on a plane that is roughly perpendicular to a normal spacing between the first boundary surface and the second boundary surface.

BRIEF DESCRIPTION OF THE DRAWING

Additional features, benefits and effects of the invention follow from the exemplary embodiment described below. The drawing which is thereby referenced shows the following.

DETAILED DESCRIPTION

Figure 1:
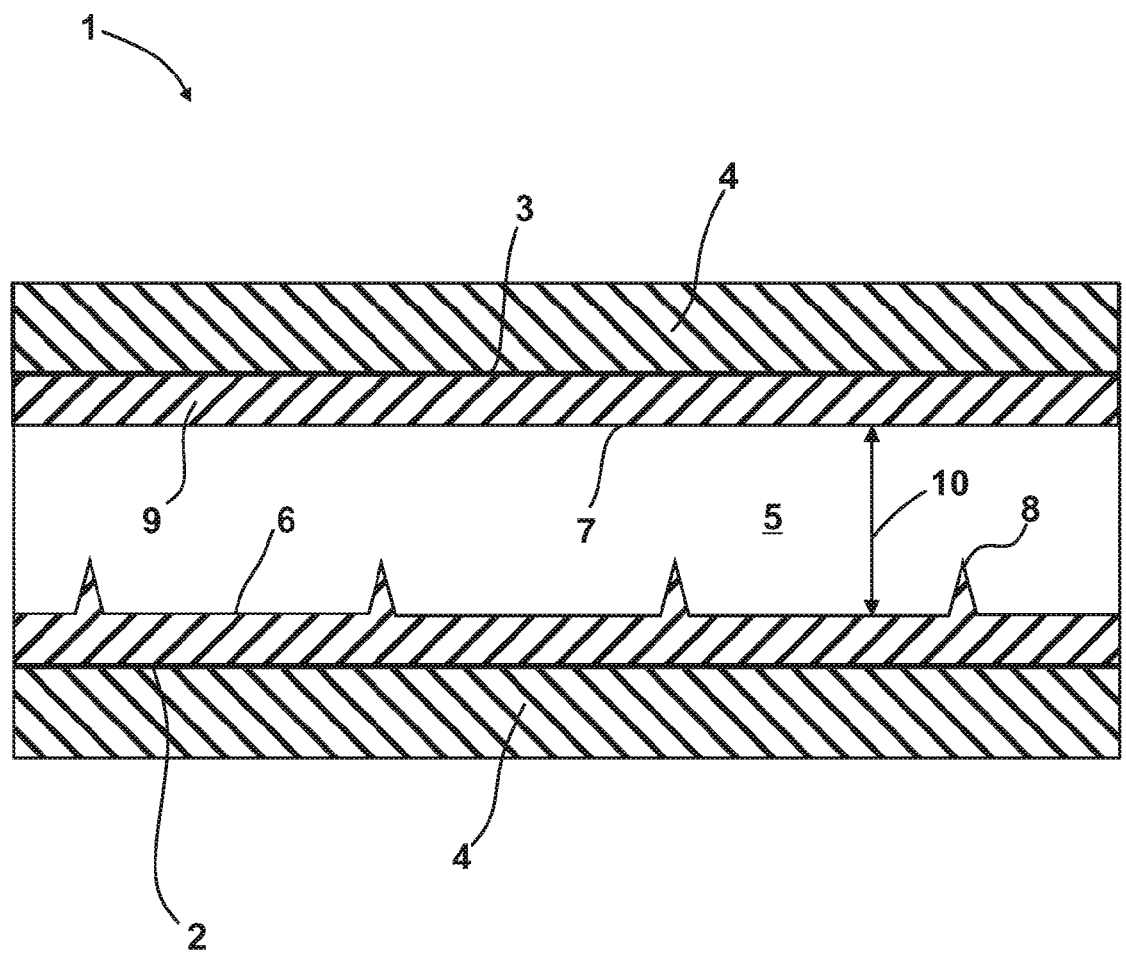
FIG. 1 and FIG. 2 Sections through apparatuses according to the invention in a schematic illustration.

FIG. 1 shows a section through an apparatus 1 according to the invention in a schematic illustration, wherein a working space 5 is visible which is bounded on a bottom side by a first boundary surface 6 and on a top side by a second boundary surface 7. A first electrode 2 is connected in an electrically conductive manner to the first boundary surface 6, which is typically composed of a metal.

The first boundary surface 6 comprises field-enhancement devices, or field-enhancers, embodied as cone-shaped peaks 8, which field-enhancement devices are arranged such that they are distributed uniformly, as illustrated, on the first boundary surface 6, namely such that they are typically also perpendicular to the sectional plane illustrated. The peaks 8 have a taper angle of less than 30° in order to achieve a beneficial field enhancement and thus an advantageous ionization of the working gas.

The second boundary surface 7 is connected in an electrically insulating manner to a second electrode 3 via a dielectric such as glass, for example, so that an electric field is produced when an electric voltage is applied between the first electrode 2 and the second electrode 3 in the working space 5, which electric field is enhanced in the region of the peaks 8.

In the working space 5, an easily ionizable gas such as argon or the like is used which is arranged in the working space 5 in such a diluted manner that a free path length between molecules of the working gas is greater than a surface boundary spacing 10, which is defined as the maximum distance between the first boundary surface 6 and the second boundary surface 7. In this case, the boundary surface spacing 10 is less than 5000 nm, so that a natural molecular motion can be utilized in order to transmit energy between the first boundary surface 6 and the second boundary surface 7. Of course, to establish a large temperature gradient, multiple apparatuses 1 illustrated schematically in FIG. 1 can be connected in series. These can then be connected via a substrate 4, preferably a silicon substrate, on which the electrodes 2, 3 embodied in a planar manner are arranged.

Thus, when an electric voltage is applied, molecules of the working gas are ionized at the peaks 8, at which an electric field strength can be $10^8$ V/m, for example, whereupon these molecules are accelerated towards the second boundary surface 7 by the electric field. In a movement towards the second boundary surface 7, the molecules absorb energy from the electric field, as a result of which they are heated. Upon impact of the molecules on the second boundary surface 7, the molecules then release energy to the second boundary surface 7, whereby the second boundary surface 7 is heated. At the same time, the molecules bounce off the second boundary surface 7 and are moved in the working space 5 by a natural molecular motion, wherein the molecules sooner or later come into contact with the first boundary surface 6. Before this contact, the molecules lose energy due to the movement against the electric field, so that the molecules cool during the movement and, upon reaching the first boundary surface 6, are colder than when they bounce off of the second boundary surface 7. Thus, at the first boundary surface 6, molecules can absorb energy from the first boundary surface 6, wherein the molecules are heated. The molecules are then moved towards the second boundary surface 7 by the electric field in combination with the natural molecular motion, at which second boundary surface 7 the molecules once again release energy.

Between the second electrode 3 and the second boundary surface 7, a dielectric, in particular an insulator 9 such as glass, is arranged so that a current flow into the working space 5 from the second electrode 3 can essentially be avoided. Oftentimes, a diffusion of electrons through the dielectric cannot be completely avoided. If electrons diffuse into the working space 5 from the second electrode 3, or, if the polarity is reversed, electrons diffuse through the second boundary surface 7 to the second electrode 3 from the working space 5, this can cause a molecule of the working gas to once again be placed in an uncharged state. However, due to the natural molecular motion, a molecule of this type also sooner or later contacts a region of the peaks 8 so that even the molecules discharged as a result of a diffusion of electrons are ionized in order to maintain the process. With the method, it is thus essentially possible to transfer thermal energy from the colder first boundary surface 6 to the warmer second boundary surface 7 without an input of external energy.

Figure 2:
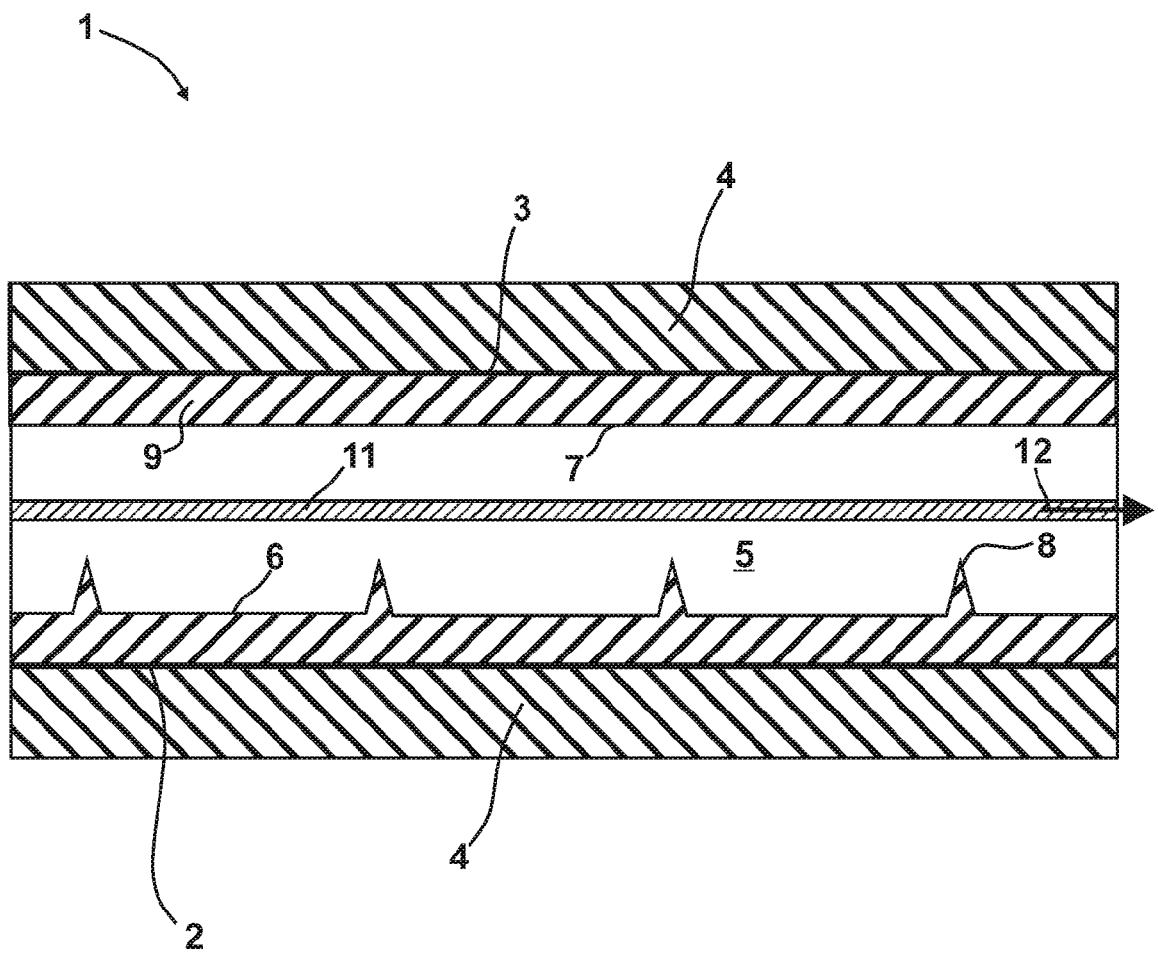

FIG. 2 shows an apparatus 1 according to the invention, which apparatus 1 is used as a superconductor. As can be seen, a conductive layer 11 is thereby formed between the boundary surfaces 6, 7. This conductive layer 11 can be formed by a plasma, in particular a plasma containing lithium, sodium, potassium, rubidium, and/or cesium, at a partial pressure of $10^{-8}$ bar to $10^{-5}$ bar and at 20° C. to 100° C., or by an electron gas.

If the conductive layer 11 is formed by an electron gas, the first electrode 2 or the first boundary surface 6 is typically negatively charged relative to the second boundary surface 7. A leakage current of electrons that exit the working space 5 through the second boundary surface 7 is then offset by electrons exiting the field-enhancement devices. The field-enhancement devices then typically comprise peaks 8 with a peak radius of less than 50 nm, in particular roughly 1 nm to 12 nm, and a voltage between the second boundary surface 7 and the first boundary surface 6 is then roughly 1 volt, for example. If the conductive layer 11 is embodied as an electron gas, the working space 5 is typically completely evacuated or there is a vacuum in the working space 5.

If the conductive layer 11 is formed by a plasma, the first electrode 2 or the first boundary surface 6, and therefore also the field-enhancement devices, is typically positively charged relative to the second boundary surface 7. A leakage current of electrons that enter the working space 5 through the second boundary surface 7 is then offset by electrons entering the field-enhancement devices. The field-enhancement devices then typically comprise peaks 8 with a peak radius of less than 50 nm, in particular roughly 1 nm to 12 nm, and a voltage between the first boundary surface 6 and the second boundary surface 7 is then roughly 10 volts, for example. If the conductive layer 11 is embodied as a plasma, there is typically a total pressure of roughly $10^{-3}$ bar and a partial pressure of neutral particles of $10^{-8}$ bar to $10^{-5}$ bar in the working space 5.

A transmission of electric power takes place in the embodiment illustrated in FIG. 2 along the conductive layer 11, which runs roughly on a plane that is aligned roughly perpendicularly to a normal spacing between the first boundary surface 6 and the second boundary surface 7, for example in the current flow direction 12 illustrated in FIG. 2. A superconductor formed by the apparatus 1 according to the invention can then be embodied with any desired length along the conductive layer 11 and, at the same time, with a small extension perpendicular to the image plane illustrated in FIG. 1 and FIG. 2, so that long and thin conductors can be formed. A superconductor of this type can be easily activated and deactivated by applying a voltage between the boundary surfaces 6, 7, already exhibits the superconductive properties at a room temperature of approx. 20° C., and can be used both to transmit large loads and also to transmit small loads, for example, in high voltage engineering and in microelectronics. Due to the ability to activate and deactivate the conductivity, the apparatus 1 can then also be embodied as an electrical circuit breaker without mechanically movable components.

Of course, the drawings are to be understood as schematic illustrations. Thus, the first boundary surface 6 can also be made of the same material as the first electrode 2 or can merge with the first electrode 2. Accordingly, the peaks 8 can also be made of the same material as the first electrode 2. The conductive layer 11 can be embodied as a thin layer as illustrated, but it can also extend up to the second boundary surface 7 and/or into the proximity of the first boundary surface 6.

With an apparatus 1 according to the invention, the production of an artificial temperature gradient is possible in a particularly energy-saving manner and in a small space. Compared to methods from the prior art, significantly larger amounts of energy can thereby be transmitted and larger temperature gradients can be produced.

The invention claimed is:

1. An apparatus for establishing a temperature gradient, comprising:
at least one gas-tight working space having a first boundary surface connected to a first electrode and a second boundary surface connected to a second electrode;
wherein when an electric voltage is applied between the first electrode and the second electrode in the working space, an electric field can be produced between the first boundary surface and the second boundaryr surface;
a distance between the first boundary surface and the second boundary surface being less than 5000 nm;
the first boundary surface comprising at least one field-enhancer roughly cone-shaped, at least at an end side, and having a taper angle of less than 30 degrees so that upon application of an electric voltage to the electrodes an essentially homogeneous electric field is prevalent in the working space and a field strength of the electric field in a region of the field-enhancer is greater than an average field strength of the electric field in the working space, and an electric field strength at the field-enhancer is greater than an average electric field strength in the working space by at least a factor of 100.

2. The apparatus of claim 1, wherein:
the at least one field-enhancer comprises a peak.

3. The apparatus according claim 1, wherein:
a distance of the field-enhancer from the second boundary surface is less than 90% or 80% of a maximum boundary surface spacing between the first boundary surface and the second boundary surface.

4. The apparatus according claim 1, wherein:
the working space is embodied such that, when an electric voltage is applied between the electrode, an electric field is obtained in the working space, which electric field is essentially homogeneous over more than one of the following: 50% of the working space, or 70% of the working space, or 90% of the working space.

5. The apparatus according claim 1, wherein:
the working space is embodied such that, when an electric voltage is applied, an electric field is formed in the working space, which electric field is essentially homogeneous outside of a region that is spaced less than one of the following: 1000 nm, or 500 nm, or 200 nm.

6. The apparatus according claim 1, wherein:
the field-enhancer is embodied as a peak and, at one end, has an area of ess than one of the following: 10 nm$^2$ or 5 nm$^2$.

7. The apparatus according claim 1, wherein:
the first boundary surface and the second boundary surface are embodied to be essentially flat.

8. The apparatus according claim 1, wherein:
a gas is arranged in the working space, which gas has a free path length of less than one of the following: 5000 nm or 1000 nm.

9. The apparatus according claim 1, wherein:
a gas is arranged in the working space, which gas has a free path length of roughly 500 nm.

10. The apparatus according claim 1, wherein:
a gas with low ionization energy, in particular argon, xenon, C60, C60F60, iodine, SF6 or UF6, is arranged in the working space.

11. The apparatus according claim 1, wherein:
an electron gas is arranged in the working space.

12. The apparatus according claim 1, wherein:
lithium, sodium, potassium,rubidium, and/or cesium is arranged in the working space.

13. The apparatus according claim 1, wherein:
lithium, sodium, potassium, rubidium, and/or cesium is arranged in the working space in a plasma state.

14. The apparatus according claim 1, wherein:
the second boundary surface is formed by a dielectric, in particular glass.

15. The apparatus according claim 1, wherein:
the second boundary surface is connected to the second electrode solely via a dielectric.

16. The apparatus according claim 1, wherein:
the at least one peak is connected in an electrically conductive manner to the first electrode.

17. A method for transmitting electrical energy, wherein an electric voltage is applied to a working space of an apparatus according to claim 1 having a gas-tight working space having a first boundary surface, at which field-enhancers are arranged, and a second boundary surface, whereupon a plasma or an electron gas is formed in the working space by an electric field, after which electrical energy is transported by the plasma or by the electron gas.

18. A method of establishing a temperature gradient, comprising:
using the apparatus according to claim 1 as an electrical conductor.

19. A method for establishing a temperature gradient with an apparatus according to claim 1 having a gas-tight working space having a first boundary surface and a second boundary surface by a working gas located in the working space, to which working gas an electrical field is applied, said method comprising:

ionizing molecules of the working gas in the working space at the field-enhancer arranged at the first boundary surface;

whereupon the ionized molecules are moved to the second boundary surface by the electric field while being heated, at which second boundary surface the molecules release energy, after which the molecules are moved to the first boundary surface while being cooled;

whereupon the molecules absorb energy at the first boundary surface.

20. The method according claim 19, wherein:

the method is carried out essentially without an input of energy.

21. A method of establishing a temperature gradient, comprising:

using the apparatus according to claim 1 as a superconductor.

22. The method according to claim 21, wherein:

a current flow occurs on a plane that is roughly perpendicular to a normal spacing between the first boundary surface and the second boundary surface.

* * * * *